Sept. 21, 1965     R. L. DEGA     3,207,521

SEAL ASSEMBLY

Filed Jan. 30, 1963

INVENTOR.
Robert L. Dega
BY
E. W. Christen
ATTORNEY

United States Patent Office 3,207,521
Patented Sept. 21, 1965

3,207,521
SEAL ASSEMBLY
Robert L. Dega, Utica, Mich., assignor to General Motors Corporation, Detroit, Mich., a corporation of Delaware
Filed Jan. 30, 1963, Ser. No. 254,972
3 Claims. (Cl. 277—37)

This invention relates to a seal assembly, and more particularly to a track roller seal assembly for use on crawler-type tractors or the like.

Presently, bearing boxes for track rollers are sealed by means of face-type seals made of two extremely hard plates pressed together with very high loads. This type of seal requires a flatness of the plates to within three light bands in order to maintain a lubricant film thin enough to effect sealing. The plates are generally manufactured with relatively wide faces which are designed to operate similar to a thrust bearing rather than a seal. The face is wide enough to support an oil film which will build up forcing the plates apart sufficiently to allow contaminants to enter and wear away the sealing areas. Naturally, such a seal is beset with problems because of the extreme conditions in which track-laying vehicles are usually required to operate.

It is the purpose of the present invention to provide a seal assembly especially protected in applications where extreme conditions are common; to provide a seal assembly in which the individual seal components may be separately manufactured and subsequently assembled; to provide a seal assembly which may be quickly and securely assembled between a shaft and a journal box without scratching or damaging the seal running surface; to provide a seal assembly totally suited to flexible lip-type seals operating in places of deep mud and water; and to provide a seal assembly which eliminates the shaft as one of the operating variables in obtaining dynamic sealing quality.

Though the inventive seal is especially adapted for use in track roller applications, it may be used between any two relatively rotating concentric members.

In accordance with the invention, the seal assembly includes an outer sealing annulus mounted on a housing and an inner wear-sleeve circumjacent a shaft journaled in the housing, the outer sealing annulus comprising flexible fluid and dust seals engageable with the wear-sleeve, each seal having a radially extending lip portion, and the wear-sleeve including gripping means to hold the same in sealing relationship fixably on the shaft and having a special surface finish of high hardness wipingly engaged by the lip portions.

Figure 1:
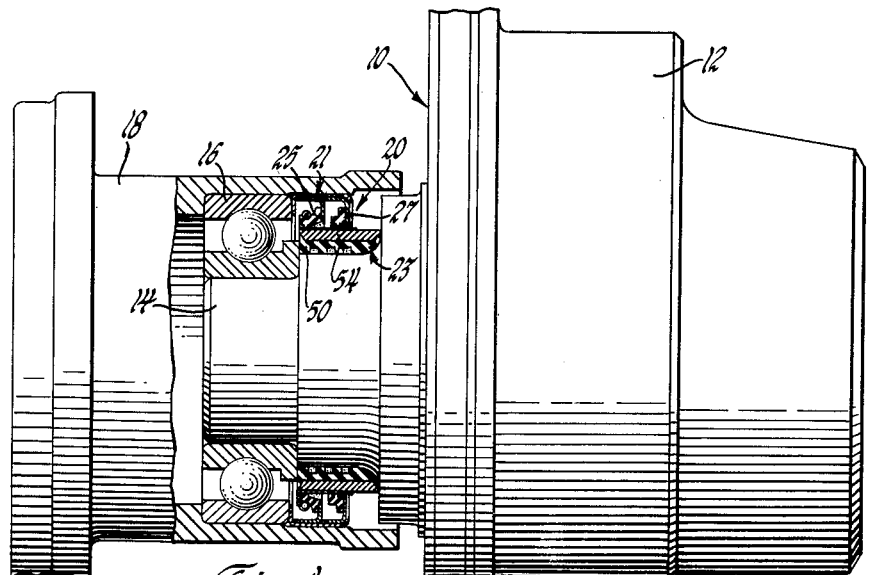
Figure 2:
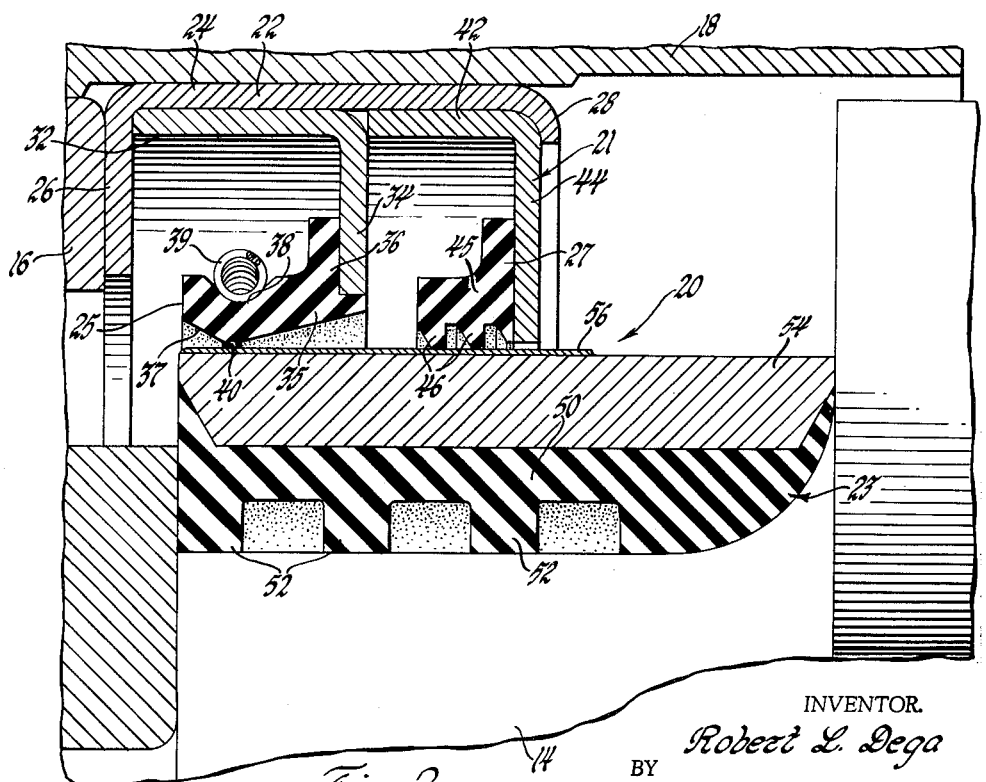

Reference is made to the following description and drawings for a more detailed understanding of the invention wherein:

FIGURE 1 shows a track roller unit broken away to expose the inventive seal assembly in cross-section; and FIGURE 2 is an enlarged cross-sectional view of the seal assembly of FIGURE 1.

Referring to FIGURE 1, the track roller unit 10 includes a wheel 12 of the sort employed in track laying vehicles for supporting and guiding the track element. The wheel 12 is connected to a shaft or axle 14 journaled in the anti-fraction bearing 16 mounted in housing 18 which may be an extension of the vehicle frame. The inventive seal assembly 20 is mounted between the axle 14 and housing 18 to prevent the egress of lubricant from the bearing compartment and the ingress of mud, water, and other contaminants into it from the outside. The seal assembly 20 includes an outer seal unit 21 mounted in the housing 18 surrounding and radially spaced from an annular wear-sleeve 23 mounted for rotation with the axle 14. A fluid seal 25 and a dust seal 27 are axially spaced in the seal unit 21 and have radially extending lip portions in wiping engagement with the surface of wear-sleeve 23 thereby sealing between the housing 18 and the axle 14.

The seal assembly 20 is shown in more detail in FIGURE 2 where it is seen that the seal unit 21 comprises an outer annular casing 22 having a cylindrical portion 24 pressed in the housing 18 joined by the radial flange 26 abutting the outer race of bearing 16. The cylindrical portion 24 is spun-over at the outer end 28 providing a shallow channel between flange 26 and end 28 adapted to contain the fluid seal 25 and dust seal 27. The fluid seal 25 includes an annular casing having a cylindrical portion 32 joined by a radial flange 34, to which is bonded or otherwise secured, an elastomeric sealing element 35. The sealing element 35 may be of any standard radial lip seal construction, but is preferably of the type described in my copending application S.N. 46,412 entitled "Fluid Seal Construction," filed August 1, 1960, now abandoned. The seal there described is designed to run on an oil film in the order of 5–20 microinches instead of directly on the shaft. Maintaining this film is dependent on several operating variables, one of which is the shaft surface. The present assembly eliminates this troublesome variable for all types of lip seals, but this feature is especially significant for the seal disclosed in my application S.N. 46,412. The specific seal construction forms no part of the present invention however, and as illustrated, comprises a heel portion 36, bonded or otherwise secured, to the radial flange 34, and a head portion 37 having an annular groove 38 adapted to receive and locate a continuous coil spring 39 generally circumjacent the sealing lip 40 being circumferentially engageable and radially biased into wiping engagement with the wear-sleeve 23.

The seal unit 21 is completed by the assembly of the dust seal 27. The dust seal 27 includes an annular casing having a cylindrical portion 42 joined by a radial flange 44, to which is bonded or otherwise secured, an elastomeric dirt or dust sealing element 45 characterized by having a plurality of axially spaced dust lips 46 formed thereon and radially extending into wiping engagement with the wear-sleeve 23. Radial flange 44 is designed to act as a guard against the entry of stones or the like, but more importantly, to exclude mud. In track roller applications mud is a major cause of failure because natural hydraulic pressures acting on the mud cause it to force a flexible lip seal away from sealing relationship with the shaft. Of course, the mud then can enter the bearing compartment and damage that mechanism. It is for this reason, that face-type seals replaced lip seals in such uses but now it is possible with my seal construction to utilize a lip type seal in the presence of high pressure mud because the flange 44 radially projects to within approximately 0.005 of an inch from the wear-sleeve surface. Normal mud pressures are not so great as to cause extrusion between the flange 44 and the wear-sleeve surface operating with such a small running gap. This gap is exaggerated in FIGURE 2 for purposes of illustration.

A feature about the sealing unit 21 is that the individual seals 25 and 27 may be molded, cut and subsequently assembled in the outer casing 22 by a spinning operation, providing an easily handled, unitized package which may be quickly and economically assembled in the housing. Furthermore, since the seal assembly as a whole is not of a unitized nature, it may be disassembled at times for cleaning and periodic inspection or replacement of worn components without having to replace the whole assembly.

From the point of sound engineering practice, a seal design requires that one rubbing face be of a hardened material while the other be of a resilient material which will have the ability to embed minute solid contaminants, and more importantly; the hardened surfaces must have a particular surface finish and be reasonably free of machining marks and scratches which may independently contribute to seal leakage. Preparation of such a surface may be by any acceptable means, but plunge grinding has provide satisfactory.

To this end, the sealing unit 21 cooperates with the wear-sleeve 23. The wear-sleeve is provided with an inner elastomeric liner 50 which is molded to conform to the surface of the axle 14 and sealably grip it; the liner has circular fingers 52 especially adapted for this purpose and the polymer elasticity may be chosen so that the effect of any localized shaft imperfections or surface blemishes is not transmitted to the concentric surface of the wear-sleeve thereby eliminating a common cause of leakage in lip seals. The rigid base 54, to which liner 50 is bonded, has a coating 56 on a portion of its surface which is harder than the axle 14, usually formed of high strength steel. The coating may be an electroplated metal or a mechanically applied material pressed or fitted on as a separate sleeve; it must be hard and smooth and preferably of a material such as chromium, aluminum oxide, tungsten carbide, hardened tooled steel, chromium oxide, or the like. I have found chromium to be best suited for the reason that its wear properties are superior in the presence of contaminants and when used with the elastomeric materials commonly used to make lip seals. The wear characteristics of chromium are such that the surface particles of the plated material are worn away to produce a continuously smooth path as opposed for example, to tungsten carbide or aluminum oxide which wear in a very rough pattern and in turn, tear at the elastomeric sealing material. The coating provides a special running surface for the seal lips 40 and 46. Normally such seals run directly on the shaft, in which case, any scratches, machining imperfections, or surface asperities will affect the sealing quality. Such surface blemishes are unavoidable in mass production shafts and may also be caused while assembling the shaft in the equipment. In contrast, the wear-sleeve 23 is a separate unit and has a coating 56 of a few inches in width and at least 0.005 of an inch thick to which serious attention may be directed in providing an ideally suited running surface for lip seals, and especially for the type disclosed in my application S.N. 46,412. That seal is most effective when running on a surface that is finished to vary in roughness in the order of 5 to 20 microinches and preferably, averaging approximately 15 microinches. A surface finish that is too smooth is as detrimental as one that is too rough, but for different reasons. If the surface is too smooth, the lip will run partially dry because of the inability of lubricant to wet beneath it, while if the surface is too rough the shaft asperities will abrade the lip; either condition is accompanied by lip wear leading to eventual failure. Accordingly, the coating 56 should have a surface finish of approximately 15 microinches.

The central purpose of any seal is to exclude the bearing compartment, dirt, mud, water, and other deleterious substances and to retain oil or bearing lubricant. It is important to realize, in this connection, first; that the radial flange 44 extends to within a very small clearance of the wear-sleeve and acts as a guard against the entry of mud or dust, while the housing 18, being closely spaced to the wheel hub, prevents damage from rocks and boulders, and secondly; dust lips 46 behind the radial flange 44 have vertical outer faces which intersect the wear-sleeve at right angles to minimize the possibility of dirt being wound or wedged beneath the wiping surface disengaging it from sealing contact. The same feature is incorporated in the fluid sealing lip described in application S.N. 46,412. Since a lubricant material, such as grease or other viscous oil, is usually packed in the space between the two seals it will act to entrap any dirt that manages to slip beyond the dust lips. The substantially vertical inner face of the fluid sealing lip prevents grease being lost by wedging under the lip when running; while the inner faces of the dust lips are inclined at approximately 30° from vertical to reduce the possibility of the lips running dry and yet minimize any wedging action that would permit all the grease to run out in a short time. In addition, the design of these dust lips is intended to stabilize them against axial flexure as would be the case if both lip faces were vertical. In other words, by inclining the inner faces as shown, there will be a lesser tendency for the lips to flex inwardly under the action of pressures from the outside.

Although a specific seal construction has been illustrated and described herein, various structural modifications are possible within the scope of the invention. It is intended that obvious modifications of the illustrative embodiments be included in the scope of the appended claims, insofar as limited by the prior art.

I claim:

1. A fluid seal installation for sealing two relatively rotating members comprising, an annular wear sleeve having a hard smooth surface and having an elastomeric liner sealably gripping one of the members for rotation therewith, said elastomeric liner being deformable to the extent necessary to compensate for any local surface defects of said one member and locate said wear sleeve in concentric relationship to said one member, an annular sealing unit mounted on the other of said members and including a casing unit having a radially extending flange located adjacent but not engaging said wear sleeve, a first elastomeric sealing annulus secured to said casing unit and having a radially extending fluid sealing lip, a second elastomeric sealing annulus axially spaced from said first annulus and secured to said casing unit, said second annulus having a plurality of parallel axially spaced radially extending dust sealing lips, each being uniformly engageable with said wear sleeve and having substantially vertical face portions on the side thereof adjacent said radially extending flange, said fluid sealing lip and dust sealing lips each being uniformly engageable with the hard smooth surface of the wear sleeve whereby the lip portion and the smooth surface cooperate to provide effective sealing regardless of surface properties of said one member.

2. A device according to claim 1 wherein said casing unit comprises, an annular shell, means secured to said annular shell and including said radially extending flange, said flange providing a mounting for said dust sealing lips, and means secured to said annular shell and including a second radially extending flange spaced from said first radially extending flange and providing a mounting for said fluid sealing lip.

3. A device according to claim 1 wherein said radially extending dust sealing lips have face portions on the side thereof adjacent said fluid sealing lip which form acute angles with the surface of the annular wear sleeve to provide lubrication for said dust sealing lips.

References Cited by the Examiner

UNITED STATES PATENTS 3,011,814 12/61 Rhoads et al. _____ 277—37

FOREIGN PATENTS 449,634 7/36 Great Britain.
523,149 3/54 Belgium.

OTHER REFERENCES

Machine Design—The Seals Book, The Penton Publishing Company, January 1961, page 12.

Obert, E. F.: Internal Combustion Engines, International Textbook Company, 1950, pages 533–534.

LEWIS J. LENNY, *Primary Examiner.*

SAMUEL ROTHBERG, EDWARD V. BENHAM,
*Examiners.*

UNITED STATES PATENT OFFICE
CERTIFICATE OF CORRECTION

Patent No. 3,207,521  September 21, 1965

Robert L. Dega

It is hereby certified that error appears in the above numbered patent requiring correction and that the said Letters Patent should read as corrected below.

Column 1, line 61, for "anti-fraction" read -- anti-friction --; column 2, line 1, strike out "the", first occurrence; line 69, for "surfaces" read -- surface --; column 3, line 2, for "provide" read -- proved --; line 53, after "exclude" insert -- from --; column 4, line 16, after "claims," insert -- except --.

Signed and sealed this 21st day of June 1966.

(SEAL)
Attest:

ERNEST W. SWIDER
Attesting Officer

EDWARD J. BRENNER
Commissioner of Patents